US009130205B2

(12) United States Patent
Reiser

(10) Patent No.: US 9,130,205 B2
(45) Date of Patent: Sep. 8, 2015

(54) CONTROLLING PEM FUEL CELL VOLTAGE DURING POWER TRANSITIONS AND IDLING

(75) Inventor: Carl A. Reiser, Stonington, CT (US)

(73) Assignee: Audi AG, Ingolstadt (DE)

( * ) Notice: Subject to any disclaimer, the term of this patent is extended or adjusted under 35 U.S.C. 154(b) by 230 days.

(21) Appl. No.: 13/261,721

(22) PCT Filed: Feb. 25, 2011

(86) PCT No.: PCT/US2011/000349
§ 371 (c)(1),
(2), (4) Date: Aug. 22, 2013

(87) PCT Pub. No.: WO2012/115605
PCT Pub. Date: Aug. 30, 2012

(65) Prior Publication Data
US 2013/0320910 A1 Dec. 5, 2013

(51) Int. Cl.
B60L 11/00 (2006.01)
H01M 8/04 (2006.01)
B60L 11/18 (2006.01)
(Continued)

(52) U.S. Cl.
CPC ....... H01M 8/04619 (2013.01); B60L 11/1881 (2013.01); B60L 11/1887 (2013.01); H01M 8/04089 (2013.01); H01M 8/04552 (2013.01); H01M 8/04559 (2013.01); H01M 8/04656 (2013.01); H01M 8/04753 (2013.01); H01M 8/04873 (2013.01); H01M 8/04947 (2013.01); H01M 16/003 (2013.01); H02J 7/0052 (2013.01); H01M 2250/20 (2013.01); Y02E 60/50 (2013.01); Y02T 90/32 (2013.01); Y02T 90/34 (2013.01)

(58) Field of Classification Search
None
See application file for complete search history.

(56) References Cited

U.S. PATENT DOCUMENTS 7,041,405 B2 * 5/2006 Skiba et al. .................. 429/429
8,415,065 B2 4/2013 Yoshida
(Continued)

FOREIGN PATENT DOCUMENTS

JP 2-168803 A 6/1990
JP 2000-348746 A 12/2000
(Continued)

OTHER PUBLICATIONS

International Search Report, mailed Mar. 22, 2012, for International Application No. PCT/US2011/000349, 3 pages.

Primary Examiner — Leigh Garbowski
(74) Attorney, Agent, or Firm — Seed IP Law Group PLLC

(57) ABSTRACT

The controller (185) of a fuel cell stack (151) in a vehicle (150) responds to lower demand to cause a diverter (172) to direct all air from the cathodes (19) except as required to generate sufficient power to limit cell voltage to a safe idle voltage threshold, cause storage in an energy storage system (201) sufficient to limit cell voltage to the idle voltage threshold unless SOC is too high, connects a voltage limiting load (220) to the stack sized to consume all power not consumed by auxiliary BOP, or, for longer idles, air-starves the stack and powers BOP from storage. In response to increase in a demand signal, the controller causes flow of all air to the cathodes. In response to an off signal (223) or a start signal (193) the controller causes a shutdown routine or a startup routine in each of which all generated power is stored to maintain fuel cell voltage below a threshold, or is consumed in the voltage limiting load.

12 Claims, 5 Drawing Sheets

(51) Int. Cl.
*H01M 16/00* (2006.01)
*H02J 7/00* (2006.01)

(56) References Cited

U.S. PATENT DOCUMENTS

| | | |
|---|---|---|
| 2003/0129459 A1 | 7/2003 | Ovshinsky et al. |
| 2006/0068249 A1 | 3/2006 | Fredette |
| 2006/0083965 A1 | 4/2006 | Rainville et al. |
| 2008/0171239 A1 | 7/2008 | Tucker et al. |
| 2009/0098427 A1 | 4/2009 | Reiser |
| 2009/0263683 A1 | 10/2009 | Baumann et al. |
| 2010/0068566 A1* | 3/2010 | Motupally et al. ............... 429/13 |
| 2010/0291449 A1 | 11/2010 | Fredette |
| 2011/0008686 A1* | 1/2011 | Gould et al. .................. 429/400 |

FOREIGN PATENT DOCUMENTS

| | | |
|---|---|---|
| JP | 2002-204505 A | 7/2002 |
| JP | 2007-194042 A | 8/2007 |
| JP | 2009-517837 A | 4/2009 |
| JP | 2009-289547 A | 12/2009 |
| JP | 2010-176860 A | 8/2010 |
| JP | 2010-272449 A | 12/2010 |
| WO | 2007/064317 A1 | 6/2007 |

* cited by examiner

CONTROLLING PEM FUEL CELL VOLTAGE DURING POWER TRANSITIONS AND IDLING

This application is a 371 of PCT/US2011/000349 filed Feb. 25, 2011.

TECHNICAL FIELD

During startup, shutdown and power reduction transitions and idling, a PEM fuel cell power plant selectively stores electrical energy, or dissipates that energy in voltage limiting devices, or diverts cathode air, or employs a combination of them.

BACKGROUND ART

It is known that corrosion of amorphous carbon catalyst supports and metal catalyst of proton exchange, polymer electrolyte membrane (PEM) fuel cells, that occurs during high cell voltage conditions (e.g., above about 0.87V), results in a permanent decay of fuel cell performance. During shutdown, unless an inert gas purge is used, air will slowly, uniformly fill both the anode and cathode flow fields of the fuel cell. During startup, hydrogen is fed to the anode flow field which results in the inlet to the anode flow field being primarily hydrogen while the exit of the anode flow field is primarily air. This raises the potential of the cathode, opposite to the air rich zone on the anode, to a potential of 1.4-1.8 volts versus a standard hydrogen electrode. This potential causes the carbon based catalyst support to corrode and results in decreased cell performance.

In automotive applications, that may experience 50,000-100,000 startup/shutdown cycles, this results in catastrophic performance loss. Heretofore, solutions to this problem include stabilizing the fuel cell stack by purging the anode flow fields with an inert gas, such as nitrogen, and maintaining an auxiliary load across the fuel cell stack during the shutdown and startup processes. More recent solutions require maintaining a hydrogen rich gas throughout the stack (fuel and air) and associated plumbing.

In automotive applications, the availability of an inert gas, and the apparatus to employ it for purging will be prohibitively complex and expensive. The maintenance of a hydrogen rich gas will also require design complexity. The use of an auxiliary load requires dissipation of the heat generated thereby.

In automotive applications, PEM fuel cell power plants typically have a very wide range in demand, the swings to very low demand causing open circuit voltage conditions. Under open circuit voltage conditions, the high relative cathode voltage causes cathode catalyst corrosion, which in turn results in excessive performance decay. Because such fuel cells also have sudden increases in power demand, the reactant air flow to the cathode must be available to meet such demand, and therefore the air pump must continue to operate during low demand in order to accommodate a quick resumption of a higher demand for power.

In patent publication US 2006/0068249 A1, during a startup and shutdown or other power reduction transitions of a fuel cell stack, the spurious energy generated by the consumption of reactants therein is extracted in the form of electrical energy and stored in an energy storage device associated with the fuel cell power plant. Disclosed are a boost conFIGuration, useful when the voltage of the fuel cell stack is lower than the voltage at which it is desired to store energy in the energy storage device, and a buck configuration which is useful when the voltage of the stack is greater than the voltage at which energy is to be stored in the energy storage system.

In patent publication US 2009/0098427 A1, reactant air provided by a blower is rapidly diverted to ambient in response to low power demand that could result in high cathode voltage conditions, such as greater than 0.87 volts per cell. The blower is run at a higher level than required during the low output power demand and is thus ready to respond to rapid increases in output power demand.

An optional auxiliary load may be connected in parallel with the normal load whenever there is a rapid drop in output power demand, thereby dissipating the power which is generated in the process of consuming oxygen which remains in the stack, that is, residual oxygen in the flow fields and absorbed on the catalyst. The auxiliary load may be cooled by air from the blower which is diverted to ambient during low demand.

In certain automotive applications, such as parcel delivery and city passenger buses, as an example, the reduction of power demand to idle conditions is frequent. For a typical bus route, the bus will start only once or twice a day but will experience as many as 1200 stop/go cycles, where the bus slows down, the demand goes to an idle condition, and thereafter the bus resumes full power demand. It is therefore necessary to control cell voltages in an appropriate fashion for the different conditions of the fuel cell stack.

SUMMARY

It has been determined that the startup and shutdown losses occur when the fuel to the stack is either started or stopped, when the fuel channels are partially filled with air. Air rushes into the channels when the fuel cell stack is shut down, and becomes partially filled with fuel when fuel is supplied to them during startup. That causes the cell area that has air in the channels on both anode and cathode sides to have a reversal in local voltage, which causes high local voltage, with attendant high corrosion. These voltages can reach about 1.20V.

However, the cell voltages due to stop and go power cycling are in the 0.90 to 0.95 voltage regime, which causes much lower losses than during startup and shutdown. But since stop and go occurs as many as 1200 cycles in a single day, versus only one or two shutdowns and startups in a given day, the damage done by the stop and go cycles can be very life limiting.

Herein, startup and shutdown are treated differently than stop and go. When power demand of a fuel cell power plant in normal operation is reduced to a point at which fuel cell voltages rise to or above a threshold level, air is instantly diverted from the cathodes of the fuel cells to limit the generated output power to an operating point which reduces the cell voltage, from that which it would otherwise reach, to a level at or below the threshold level. The diverter valve limits the amount of cathode air flow to that which is necessary to generate power for the auxiliary, balance-of-plant (BOP) equipment load, called "bleed air", while maintaining cell voltage at or below the threshold level.

In addition to the BOP load, if the storage device is below a threshold state of charge (SOC), the energy storage system is commanded to consume sufficient additional power to maintain cell voltage at or below a voltage level deemed to be safe during variations resulting from transitions as the system settles to the idle condition. This may be on the order of 0.87 volts per cell.

Otherwise, the stack is connected to a secondary device, such as a voltage limiting load (VLD), configured to permit operating the auxiliary (parasitic) balance-of-power plant equipment, while dissipating sufficient power to limit the cell voltages to at or below a threshold level.

Other variations will become more apparent in the light of the following detailed description of exemplary embodiments, as illustrated in the accompanying drawings.

MODE(S) OF IMPLEMENTATION

Figure 1:
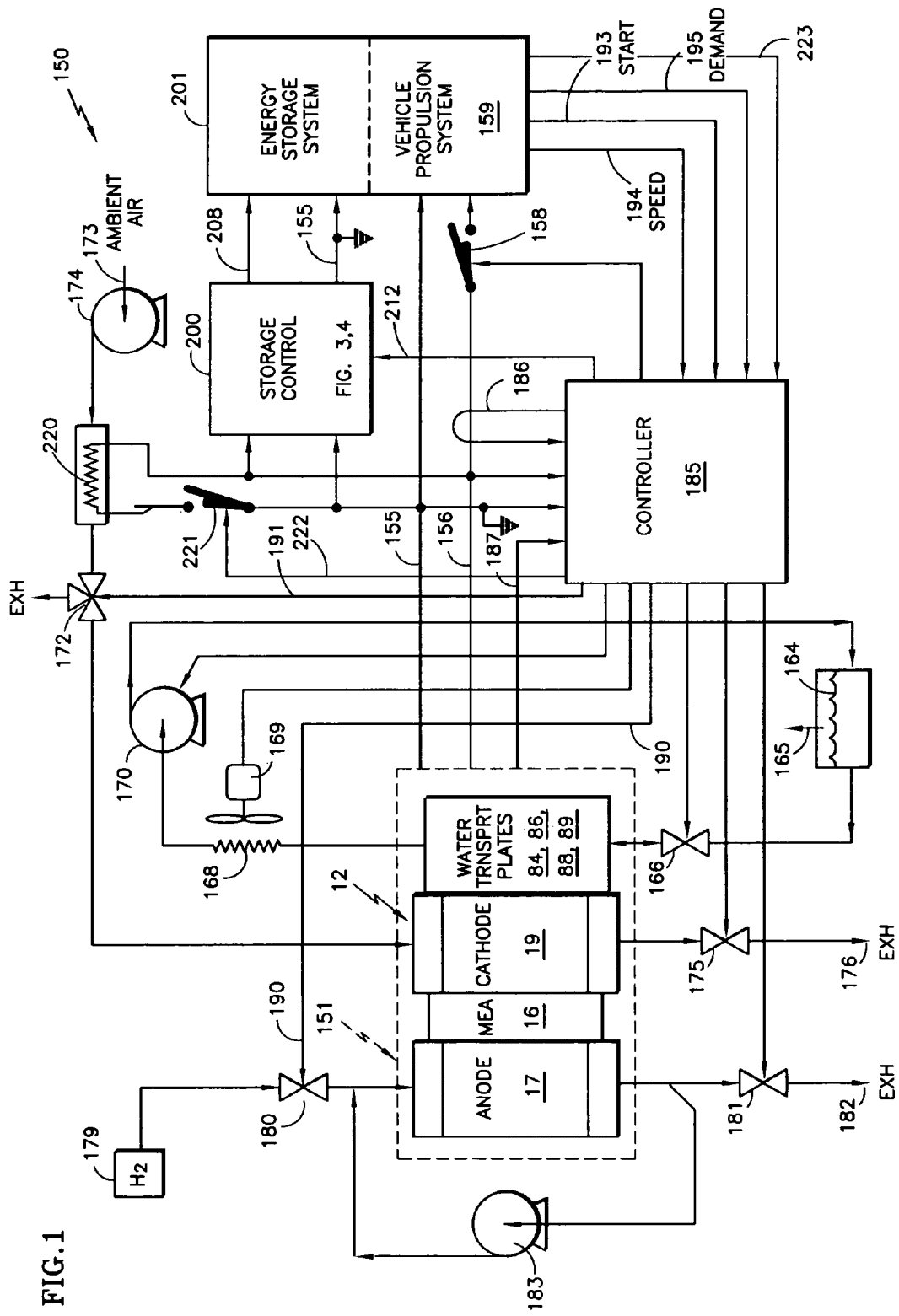
FIG. 1 is a schematic block diagram of a fuel cell power plant having an air diverter and an air cooled voltage limiting load in which the present modality may be practiced.

Referring to FIG. 1, a vehicle 150 includes a fuel cell stack 151 comprising a plurality of contiguous fuel cells, each having a proton exchange membrane 16 between an anode 17 and a cathode 19, only one fuel cell 12 being shown in FIG. 1. The electrical output at the positive and negative terminals of the fuel cell stack 151 is connected by a pair of lines 155, 156 through a switch 158 to an electric or hybrid vehicle propulsion system 159.

A water circulation system has a reservoir 164 with a vent 165, a pressure control trim valve 166, water passages 84, 86, 88, 89, a radiator and fan 168, 169 which is selectively operable to cool water circulating in the system, and a water pump 170. Ambient air at an inlet 173 is provided by a pump, such as a blower 174, a compressor, or the like, through a two-way diverter valve 172 to the oxidant reactant gas flow fields of the cathodes 19, and thence through a pressure regulating valve 175 to exhaust 176. Hydrogen is supplied from a source 179 through a flow regulating valve 180, which may be a pressure regulating valve, to the fuel reactant gas flow fields of the anodes 17, and thence through a purge valve 181 to exhaust 182. A fuel recycle loop includes a pump 183.

A controller 185 responds to load current determined by a current detector 186 as well as to the voltage across the lines 155, 156; it may also have temperature of the stack provided on a line 187. The controller controls the valve 180 over a line 190 and the valve 172 over a line 191, as well as controlling the other valves 166, 175, 181, the switch 158, and the pumps 170, 174, as shown in FIG. 1.

The controller 185 responds to start, speed, demand and off control signals on lines 193-195, 223 from the vehicle propulsion system 159, which will indicate when the fuel cell should commence operation, and the amount of power being demanded by the vehicle propulsion system. Whenever a start signal is sent from the vehicle propulsion system 159 over the line 193 to the controller 185, signals from the controller will cause the valves 180, 181 and the pump 183 to be operated appropriately to provide fuel reactant gas to the flow fields of the anode 17, and the valves 172 and 175 as well as the pump 174 will be operated appropriately to provide ambient air to the flow fields of the cathode 19. A simplified, exemplary startup routine 303 is described hereinafter with respect to FIG. 4.

When fuel and air of sufficient quantity have been provided uniformly to the cells, suitable voltage will be detected on the lines 155, 156 by the controller 185. At that time, the controller may close switch 158 so as to connect the fuel cell stack 151 to the vehicle propulsion system 159.

During startup or shutdown, a storage control 200 may dissipate the energy stored in the fuel cell stack by applying it to an energy storage system 201, which in the present embodiment is the battery of the vehicle propulsion system 159. In other embodiments, the energy storage system 201 may be some other battery, it may be a capacitor, or a flywheel, or it may be some other energy storage device. The energy storage apparatus 200, 201 will assist in providing or absorbing power during high or low demands, respectively, provided the current SOC is appropriate.

The two-way diverter valve 172 is adjusted to provide none, some or all of the air from the pump 174 to the oxidant reactant gas flow fields of the cathode 19. When the load demand drops to the point at which the fuel cells approach open circuit voltage, such as when the vehicle slows, stops or travels downhill, a signal from the controller on a line 191 adjusts the valve 172 to immediately divert some or all of the air to ambient. During low demand, the air pump may be operated at an air flow rate in excess of the flow required in the fuel cells so that the stack can respond quickly to increased demand. In any given implementation of the invention having a metering valve 172, the controller may provide a signal on the line 191 as an inverse function of the load so that the diverter valve 172 diverts an appropriately proportional amount of air to ambient.

By utilizing the diverter valve 172 to dump the air, the pump 174 can remain running and the amount of air flowing to the cathode is reduced immediately so that only a small amount of residual air remains in the cathode flow fields and in the electrode structures. In some embodiments, the speed of the pump 174 may be reduced during low loads, or even stopped.

The apparatus just described is used in conjunction with a secondary device, such as a power dissipating voltage limiting load 220, which is connected to the fuel cell output lines 155, 156 through a switch 221 by the controller, in response to a signal on a line 222. The voltage limiting load 220 is cooled, in this embodiment, by the air flow from the pump 174 as it passes to and through the diverter valve 172 to exhaust. This allows a greater dissipation of energy from the residual oxygen in the cathodes. The voltage limiting load 220 is placed downstream of the diverter valve 172 so that during normal operation, there is no pressure drop thereacross. This embodiment will entail a less rapid change in the air flow to the cathodes when air is diverted by the valve 172 due to a pressure drop across the voltage limiting load 220. The voltage limiting load may comprise a secondary device other than a resistive load.

It is preferred that the physical location of the voltage limiting load 220 is such that it is cooled by ambient air as well. Alternatively, the auxiliary load may be connectable between the pump 174 and the valve 172.

This modality may also be used in stationary and other types of fuel cell power plants.

In order to utilize the modality herein, a scheme of controls is beneficial. The disclosure of exemplary embodiments herein are representative of overall, macro functional steps and relationships which illustrate the modality, but are not necessarily complete with adequate detail for operation of a fuel cell power plant utilizing the modality, but, as will appear, other mundane details are conventional and known in the art. It is assumed that the exemplary routines described hereafter are processed in a repetitive fashion, depending on the timing of transitions in the involved parameters. For a city bus, the routines herein could be reached between 1 and 3 times per second with adequate control. In these disclosed routines, flags are used to advance the program from one state to another. These flags are described at times before their mode of being placed into such state are disclosed. However, all flags are fully described throughout.

Figure 2:
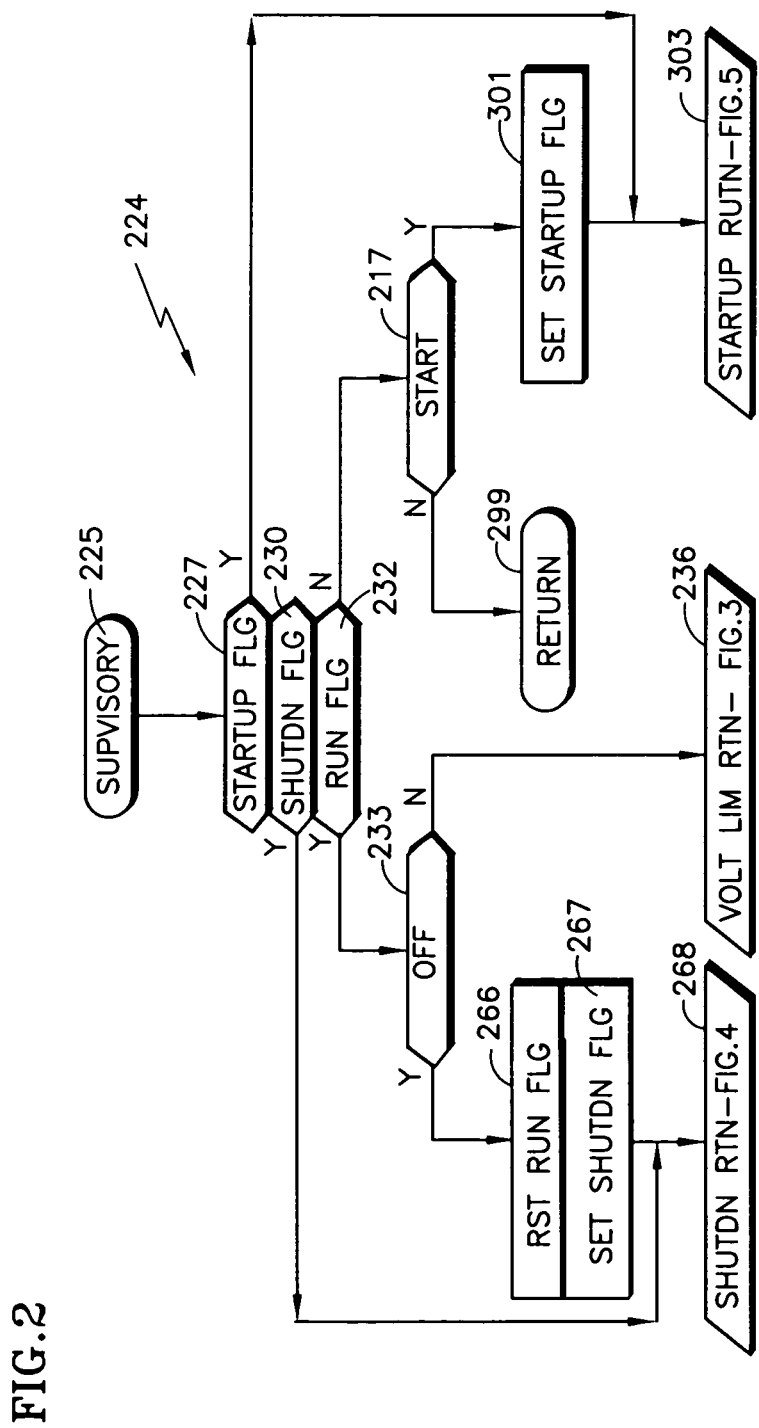
FIG. 2 is a flow diagram of a simplified, exemplary supervisory control program to assist in implementing the present modality.

In FIG. 2, a simplified exemplary supervisory routine 224 is entered through an entry point 225. A first test 227 determines if a startup flag has yet been set. If the power plant is shut down, running or in the process of being shut down, it will not be in the process of a startup, and the result of test 227 will be negative. Similarly, a test 230 determines if a shutdown flag has been set, indicating that a shutdown procedure is being performed. Assuming it has not, a test 232 determines if a run flag has been set.

For ease of reaching the description of the stop and go modality herein, it is assumed that the fuel cell power plant 150 is fully operational and running. The run flag has been set so an affirmative result of test 232 reaches a test 233 to determine if the off signal on the line 223 (FIG. 1) has been received from the vehicle propulsion system 159. The off signal indicates that the vehicle has been turned off, such as by the equivalent of an ignition key type turnoff switch. If the vehicle is still operating, a negative result of test 233 will reach a voltage limiting routine 236 illustrated in FIG. 3.

Figure 3:
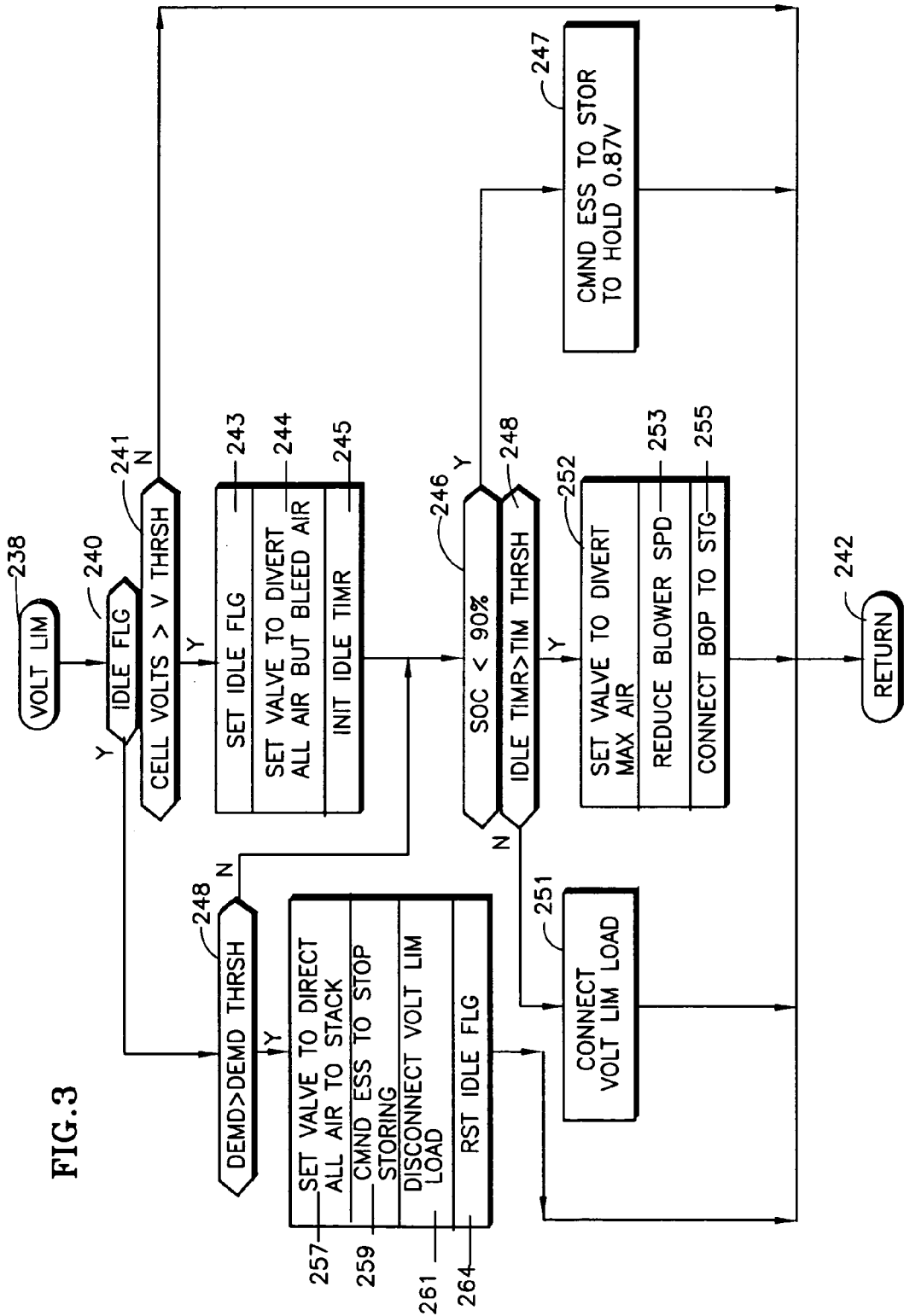
FIG. 3 is a flow diagram of a simplified, exemplary program for controlling cell voltages during stop and go operations.

In FIG. 3, the voltage limiting routine is reached through an entry point 238. A first test 240 determines if an idle flag has been set or not. Assuming the vehicle is traveling at any normal speed, the idle flag will not have been set, so a negative result of test 240 will reach a test 241 to determine if average or exemplary fuel cell voltage is greater than a threshold cell voltage. This is a voltage that, taking into account transients and the like, is indicative of a safe cell voltage, low enough to avoid corrosion, such as about 0.87 volts, or such other voltage as is determined to be proper for the fuel cell power plant employing the modality herein. Assuming the vehicle is traveling normally, the cell voltage will not be excessive, so a negative result of test 241 will reach a return point 242 by which the programming of the controller will revert to other routines.

In the course of time, the vehicle will approach a stopping point, and will reduce demand. When the demand becomes quite low, such as at an idle condition, test 241 will become positive when the cell voltage reaches the threshold, indicating that it is becoming excessive. This results in a step 243 which sets the idle flag that is tested in test 240. A step 244 will set the diverter valve to a position where it will divert all air other than that required ("bleed air") to maintain the production of sufficient power to cause the fuel cell voltages to remain below the threshold voltage. Then an idle timer is initiated in a step 245.

As an example, consider a city bus having a fuel cell power plant with a normal maximum power of 75 kW. To retain a safe voltage of about 0.87 V, the fuel cell will have to generate about 2.8 kW. In such a fuel cell power plant, for instance, the auxiliary, parasitic power requirements, such as for the coolant pump 170, air blower 174, fuel recycle pump 183, controller 185 and other power conditioning and control apparatus of the BOP, is about 1.5 kW. This means that the power generated to keep the cell voltage at a low level will be of about 1.3 kW in excess over the power consumed by the auxiliary equipment. This excess power must either be stored or dissipated in some fashion.

After the diverter valve is opened to an appropriate position, a test 246 will check the SOC of the battery to see if it can store more energy, such as an SOC of less than 90%. If so, a step 247 will command the energy storage system to store enough generated power to hold the cell voltage at 0.87 V. The routine will then revert to other programming through the return point 242.

In a subsequent pass in which the supervisory routine 224 of FIG. 2 reaches the voltage limiting routine 236 of FIG. 3, the idle flag having been set in step 243, an affirmative result of test 240 will reach a test 248 to determine if the demand indicated by the signal on the line 195 (FIG. 1) is greater than some demand threshold which is indicative of the vehicle being accelerated. If it is not, the vehicle is still idling. A negative result of test 248 reaches the test 246 again. If the SOC has not reached a storage threshold, e.g., it is still below 90%, the step 247 will continue to command the ESS to store whatever energy it takes to hold the cell voltage at 0.87V as before.

Eventually, the storage device may reach 90% of charge; then a negative result of the test 246 will reach a test 248 to determine if the idle timer has timed out. This timer was set in the step 245 as the idle condition was initiated. The idle timer may be set to a value which is adjustable in dependence upon the type of duty that the vehicle in question is generally subjected to. For instance, in a downtown city bus, the time threshold may be as low as two minutes or as high as six or seven minutes or more, to accommodate a situation where the driver may stop at a lunch stand or buy a cup of coffee. This time is greater than is generally encountered at a regulated traffic intersection, or at stops for ingress and egress of passengers. On the other hand, if the vehicle is a package delivery vehicle, the threshold time may be longer than it would be for a city bus.

If the time indicated by the idle timer has not exceeded the timer threshold, a negative result of test 248 will reach a step 251 to connect the voltage limiting load 220 (FIG. 1) to the stack, by closing the switch 221. This will cause the excess energy to be dissipated rather than stored. In the exemplary embodiment, for a dissipation of 1.3 kW at 0.87V, this load will be about 0.54 milliohms. This will ensure dissipation of approximately the correct amount of power which is not being utilized by the auxiliary, parasitic equipment of the BOP. On the other hand, if the time threshold has been reached, an affirmative result of test 248 will reach a step 252 which will set the diverter valve so that it will divert a maximum amount of air. The maximum amount of air may be all of the air, or it may be less than all of the air. But it should be sufficient to air-starve the fuel cell stack, in dependence upon all of the various operating parameters, and on whether or not the blower speed is reduced in a step 253. As described hereinbefore, the blower speed may be maintained at normal operating speed in order to assist in providing a rapid supply of air when the vehicle accelerates from an idle condition. On the other hand, blower speed may be reduced somewhat or the blower may be turned off if found necessary for any reason, such as to conserve stored energy. Optionally, it is not necessary to both divert maximum air as in step 252 and reduce blower speed as in step 253, when circumstances permit use of one or the other alone. Then, a step 255 will connect the BOP to operate from stored energy in the storage system, which is necessary in order to starve the fuel cells sufficiently so that the voltage is below the safe threshold.

Note that even if the SOC exceeds 90% after the step 247 is implemented, the test 246 can switch the action in the next pass (within a second or less) so that the voltage limiting load absorbs the power instead of it being stored. This flexibility allows maximum utilization of storage and minimum, wasteful dissipation of energy, being only that which is necessary.

In subsequent passes through the supervisory and voltage limiting routines, the vehicle will eventually begin to move, the demand on line 195 (FIG. 1) will exceed the threshold, and the test 248 will be affirmative, reaching a step 257 which will set the diverter valve to direct all air to the stack. A step 259 commands the ESS to stop storing energy for control of cell voltage; then, control of the ESS reverts to other routines in the storage control 200 (FIG. 1). A step 261 will open the switch 221 (FIG. 1) so as to disconnect the voltage limiting load 220 (FIG. 1). (Either step 259 or 291 will be harmlessly redundant.) Then a step 264 will reset the idle flag and the programming will revert to other routines through the return point 242.

In a subsequent pass through the supervisory routine 224 of FIG. 2, the run flag is still set, reaching the voltage limiting routine of FIG. 3, but in this pass through the voltage limiting routine, since the idle flag was reset in step 264, the test 240 is negative, reaching the test 241 to see if the cell voltage is greater than the threshold. In the general case, during increasing or normal demand, the cell voltage will not be excessive, so a negative result of test 241 will simply cause the programming to revert to other routines through the return point 242.

This will continue until the next stop which will cause the exchanges which are described hereinbefore with respect to FIG. 3, to establish the idle conditions. During all the stoppings of the vehicle, while the power system goes into idle, and then accelerates from idle, the supervisory routine 224 will remain in the run condition reaching the voltage limiting routine 236, and the voltage and idle time will continue to be tested and operations will react to conditions as described hereinbefore.

Thus, in the case of stopping and starting up, the system will always divert air to quickly reduce the voltage in the cells, after which it will store the excess power if it can, or dissipate the power if it cannot store it, or it will air-starve the stack during a longer idle period. The "excess power" is defined as the amount of power generated by the stack to hold the cell voltage to a safe level which is in excess of that which the system can use to operate the auxiliary, parasitic power of the BOP.

Eventually, the end of the day will come and the propulsion system operator will provide an indication (such as by turning off the equivalent of an ignition key), so that an off signal will be provided on line 223 (FIG. 1). A subsequent pass through the supervisory routine 224 of FIG. 2 will reach an affirmative result of the off test 233. This will reach a step 266 which resets the run flag and a step 267 which sets the shutdown flag, and then advance to the shutdown routine 268 in FIG. 4.

Figure 4:
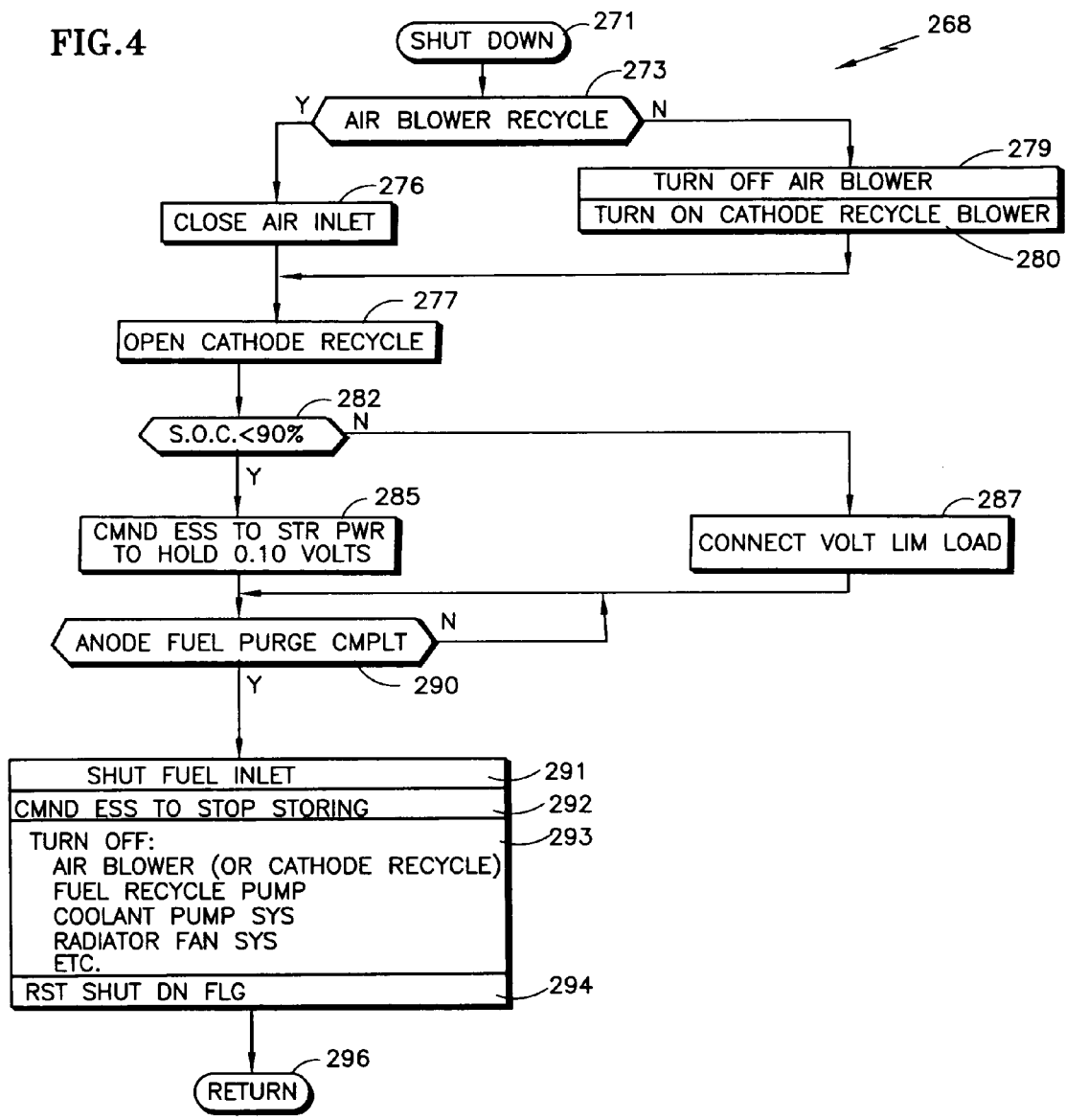
FIG. 4 is a flow diagram of a simplified, exemplary program which can be utilized for shutting down a fuel cell power plant when implementing the modality herein.

The shutdown routine 268 is reached in FIG. 4 through an entry point 271, where an optional first test 273 determines if the configuration employing the modality herein has an optional air blower recycle system (conventional, but not shown herein). If so, an affirmative result of test 273 reaches a step 276 to close an optional air inlet valve (not shown) and a step 277 which will open an optional cathode recycle valve (not shown). In other words, with such option, the blower 174 (FIG. 1) shifts from blowing air into the stack to recycling the cathode exhaust back into the cathode inlets. This helps settle each fuel cell into a condition where both the cathode and the anode have hydrogen in them which protects against corrosion and provides for a subsequent, orderly startup, as is known in the art.

If the air blower is not used for cathode recycle, a negative result of the test 273 will reach an optional step 279 which will turn off the air blower 174 (FIG. 1) and a step 280 which will turn on an optional cathode recycle blower (not shown), and the step 277 will open the optional cathode recycle valve. The effect is the same.

In either event (or directly from the entry point 271, if the test 273 for optional cathode recycle is not present), a test 282 determines if the SOC is less than 90°. If it is, a step 285 will command the energy storage system 201 to store all the power coming from the stack. This is different than occurs during idle wherein the amount of power stored is very selective, in accordance with the modality herein as described with respect to FIG. 3.

If the SOC is not less than 90°, then a step 287 will connect the voltage limiting load 220 (FIG. 1) by closing the switch 221. Because the effect of shutdown is a rapid decay in the amount of power being generated, the size of the voltage limiting load is not critical, so long as it is sufficient to dissipate a large amount of power. Therefore, it is possible to use the same voltage limiting load for idle as for startup and shutdown. On the other hand, in other embodiments of the modality herein, there could be several voltage limiting loads and they could be selected in dependence upon the stage of the process: startup, or shutdown (power initiation or power reduction transition), or idle that is involved.

Once power is either being stored or dissipated, depending on the steps 285, 287, a test 290 will determine when anode fuel purge is complete. This may be determined simply by an elapse of time since the cathode has shifted from inlet air to recycle air, or it may be determined by sensing the hydrogen concentration at the exits of the anodes, or it may be determined in some other fashion, such as sensing the voltage of the power being generated. These methods are conventional and can be selected to suit any particular implementation of the modality herein.

Once the fuel cells have been settled with anode fuel content, a step 291 will shut the fuel inlet, a step 292 will command the ESS to stop storing (perhaps redundantly) for control of cell voltage. Then, control of the ESS reverts to other routines in the storage control 200 (FIG. 1). A plurality of steps 293 will shut off most of the auxiliary power equipment, including the air blower or cathode recycle blower, the fuel recycle pump, the coolant pump, the radiator fan, and other BOP equipment which is not used during the period of being shut down. The shutdown flag is reset in step 294 and the programming reverts to other routines through a return point 296.

In the next subsequent pass through the supervisory routine 224 of FIG. 2, the startup flag test 227 will be negative, the shutdown flag test 230 will be negative, and the run flag test 232 will be negative so that a test 217 determines if the start flag is set; if not, programming will revert to other tasks through a return point 299. The fuel cell power plant then rests in a dormant state, awaiting a command to start up and provide power.

So long as there is no start command provided on the line 193 (FIG. 1) from the vehicle propulsion system 150, the supervisory system will work through negative results of tests 227, 230, 232 and 217 to the return point 299, and the fuel cell power plant will remain dormant.

Figure 5:
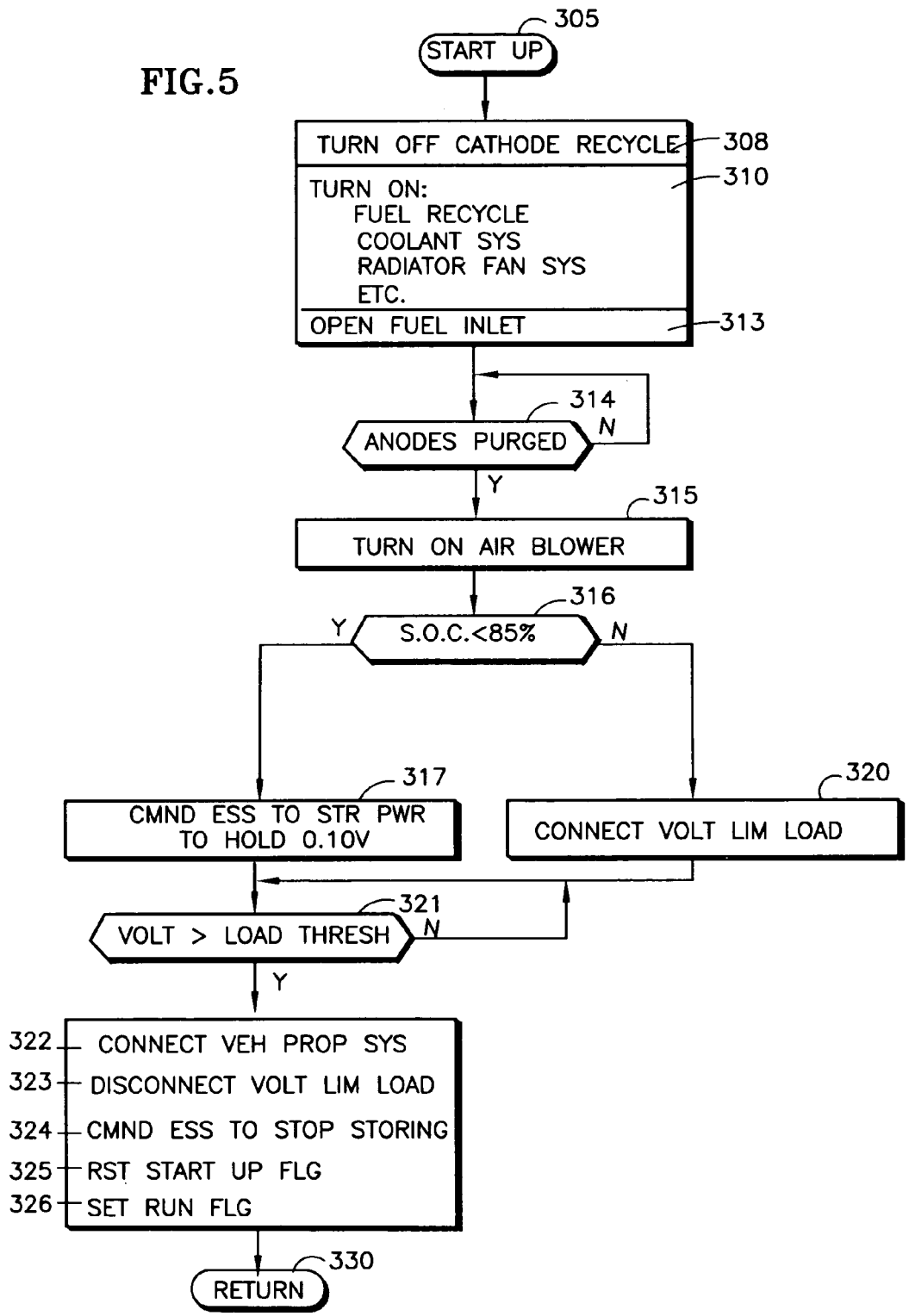
FIG. 5 is a flow diagram of a simplified, exemplary program which can be used for starting up a fuel cell power plant when implementing the present modality.

Eventually, a start command will appear on the line 193 (FIG. 1) so that a subsequent pass will find an affirmative result of the start test 217 which will reach a step 301 that will set the startup flag. Then the startup routine 303 is reached in FIG. 5 through an entry point 305. Optionally, the cathode recycle can be maintained during the dormant state of the fuel cell power plant to provide better assurance that any air leaks into the fuel cells will not result in corrosion. If so, a step 308 will turn off the cathode recycle (either open a recycle switch and/or shut off a recycle blower).

A series of steps 310 will turn on the fuel recycle pump, the coolant pump, the radiator fan, and any other parasitic, auxiliary load in the balance of plant, except for the air blower. Then the fuel inlet is opened in a step 313, and a test 314 determines when the anodes have been purged of all gas except for hydrogen, either by detection of open circuit voltage, by a matter of time since opening of the fuel inlet, by measuring a concentration of hydrogen at the anode exhaust, or otherwise.

When the anodes are suitably settled with hydrogen, a step 315 will turn on the air blower and regular power generation will commence. To avoid the initial, low power generation from raising the voltage of the fuel cells too high, the power will either be stored or dissipated as before. If desired, the measurement of the SOC and the loads may differ in this instance from that of the idle state. A test 316 determines if the SOC is less than 85%, for example, and if so, a step 317 will command the energy storage system 201 (FIG. 1) to store, and therefore demand, sufficient power to hold the cell voltage at or below the voltage which is deemed safe against corrosion during startup, such as 0.10V for instance. If the SOC is too high, a negative result of test 316 will reach a step 320 to close the switch 221 (FIG. 1) and thereby connect the fuel cell output 155, 156 to the voltage limiting load 220.

In either event, a test 321 determines if the generated voltage is equal to or greater than a threshold voltage suitable for application to the vehicle propulsion system 159 (FIG. 1). The routine will cycle on the test 321 until the voltage is adequate. Thereafter, an affirmative result of test 321 will reach a step 322 that will close the switch 158 (FIG. 1) to connect the fuel cell to the vehicle propulsion system 159, a step 323 to disconnect the voltage limiting load, and a step 324 to command the ESS to stop storing for control of cell voltage. Then, control of the ESS reverts to others routines in the storage control 200 (FIG. 1).

A step 325 will reset the startup flag and a step 326 will set the run flag. Then, the program reverts to other routines through a return point 330.

In a subsequent pass through the supervisory routine 224 in FIG. 2, the startup flag test 227 and the shutdown flag test 230 are now negative, but the run flag test 232 is now affirmative, reaching the test 233 to see if the fuel cell system has been commanded to be off by a signal on the line 223 (FIG. 1). Until an off command is received, the voltage limiting routine 236 will be repetitively reached to handle an idle condition when it occurs, all is described hereinbefore with respect to FIG. 3.

If not desired in any utilization, some of the modalities herein may be used without use of one or more of the others. For instance, the long idle feature of air-starving the stack while powering the BOP from storage may optionally be omitted.

Since changes and variations of the disclosed embodiments may be made without departing from the concept's intent, it is not intended to limit the disclosure other than as required by the appended claims.

The invention claimed is:

1. A method comprising:
a) operating a fuel cell power plant to provide electric power to a vehicle propulsion system (159);
b) monitoring fuel cell voltage during normal operation of the vehicle propulsion system;
characterized by:
c) in response to fuel cell voltage reaching a predetermined cell voltage threshold, diverting all reactant air except an amount required to generate enough power to cause the fuel cell voltage to not exceed the predetermined cell voltage threshold; and
d) after step c), and until demand of the vehicle propulsion system exceeds a demand threshold, generating enough power to cause the fuel cell voltage to not exceed the predetermined cell voltage threshold while storing electric power output of the fuel cell power plant in an energy storage system (201) in an amount equal to the difference between the amount of power required to maintain cell voltage below the predetermined cell voltage threshold and the amount of power consumed by auxiliary, balance-of-plant equipment (170, 174, 183, 185), until the state of charge of the energy storage system reaches a predetermined storage threshold.

2. A method according to claim 1 further characterized by:
during step d), in the event that the state of charge of the energy storage system reaches the predetermined storage threshold, dissipating in a voltage limiting load (220) an amount of power approximately equal to the difference between the amount of power required to maintain cell voltage below the predetermined cell voltage threshold and the amount of power consumed by auxiliary, balance-of-plant equipment.

3. A method according to claim 2 further characterized by:
if step d) continues for a period of time exceeding a predetermined time threshold, air-starving the fuel cell power plant and operating balance-of-plant using power provided by the energy storage system.

4. A vehicle (150) comprising:
a fuel cell power plant including:
balance-of-plant (170, 174, 183, 185);
a fuel cell stack (151) including a plurality of fuel cells (12), each having a membrane electrode assembly (16) adjacent to a cathode (19) with a reactant air flow field, the fuel cell stack having a power output (155, 156);
an air pump (174) for providing reactant air to the cathodes;
a diverter valve (172) connecting the air pump to the reactant air flow fields and configured to selectively divert air from said pump without diverted air passing through said reactant air flow fields;
a voltage limiting load (220) selectively connectable to the power output of the stack;
said vehicle also comprising:
a vehicle propulsion system (159) configured to be selectively powered by said stack in response to a demand signal;
an energy storage system (201);
storage control means (200) for selectively controlling the storage and retrieval of electrical energy to and from the energy storage system;
a controller (185) for selectively controlling the fuel cell stack, the diverter valve, the storage control means and the voltage limiting load;
characterized by:
the controller, in a run mode, responsive to reduction of power consumed by the vehicle propulsion system during operation, to enter an idle mode in which the controller a) operates the diverter valve so as to divert from the cathodes all air except air required by the fuel cell stack to generate predetermined idle power sufficient to cause voltage of the fuel cells to not exceed the predetermined idle threshold cell voltage, b) causes the fuel cell stack to generate predetermined idle power sufficient to cause voltage of the fuel cells to not exceed a predetermined idle threshold cell voltage, c) causes i) the storage control means to store in the energy storage system the amount of power by which the predetermined idle power exceeds the amount of power consumed by the balance-of-plant, unless the state of charge of the energy storage system exceeds a predetermined state of charge threshold in which case the controller causes ii) the fuel cell stack to generate the predetermined idle power and causes the voltage limiting load to be connected across the power output of the stack, the voltage limiting load dissipating, at the predetermined idle power, approximately the amount of power by which the predetermined idle power exceeds the amount of power consumed by the balance-of-plant.

5. A vehicle (150) according to claim 4 further characterized in that:
the idle mode continues until demand of the vehicle propulsion system exceeds a demand threshold.

6. A vehicle (150) according to claim 4 further characterized in that:
if the duration of the idle mode exceeds a predetermined time threshold, the controller ceases causing i) or ii) and instead causes air-starving the fuel cell power plant and operating balance-of-plant using power provided by the energy storage system.

7. A vehicle (150) according to claim 4 further characterized in that:
the controller (185) is responsive, in the idle mode, to demand of the vehicle propulsion system (159) exceeding a predetermined demand threshold to cause the diverter valve (220) to direct all air to the cathodes (19).

8. A vehicle (150) according to claim 7 further characterized in that:
the controller (185) is responsive, in the idle mode, to demand of the vehicle propulsion system (159) exceeding a predetermined demand threshold to ensure that the storage of power to control idle voltage ceases and that the voltage limiting load (220) is disconnected from the stack.

9. A vehicle (150) according to claim 4 further characterized in that:
the controller (185) is responsive to an off signal (223) from the vehicle propulsion system (159) to initiate a shut down routine (268) in which the controller causes iii) the storage control means (200) to store sufficient power in the energy storage system (201) to cause voltage of the fuel cells (12) to not exceed a predetermined shutdown threshold voltage unless the state of charge of the energy storage system (201) exceeds a predetermined state of charge threshold, in which case the controller causes iv) the voltage limiting load (220) to be connected across the power output (155, 156) of the fuel cell stack (151).

10. A vehicle (150) according to claim 9 further characterized in that:
the predetermined shutdown threshold voltage is higher than the predetermined idle threshold voltage.

11. A vehicle (150) according to claim 4 further characterized in that:
the controller (185) is responsive to a start signal (193) from the vehicle propulsion system (159) to initiate a startup routine in which the controller causes v) the storage control system (200) to store sufficient power in the energy storage system (201) to cause voltage of the fuel cell (12) to not exceed a predetermined startup threshold voltage, unless the state of charge of the energy storage system exceeds a predetermined state of charge threshold in which case the controller causes vi) the voltage limiting load (220) to be connected across the power (155, 156) output of the fuel cell stack (151).

12. A vehicle (150) according to claim 11 further characterized in that:
the predetermined startup threshold voltage is higher than the predetermined idle threshold voltage.

\* \* \* \* \*